(12) United States Patent
Petri

(10) Patent No.: US 6,799,483 B2
(45) Date of Patent: Oct. 5, 2004

(54) METHOD AND MECHANISM FOR CONVERTING VIBRATION INDUCED ROTATION INTO TRANSLATIONAL MOTION

(76) Inventor: Patrick Andreas Petri, 305 Memorial Dr., Room 411B, Cambridge, MA (US) 02139

( * ) Notice: Subject to any disclaimer, the term of this patent is extended or adjusted under 35 U.S.C. 154(b) by 522 days.

(21) Appl. No.: 09/977,015

(22) Filed: Oct. 12, 2001

(65) Prior Publication Data

US 2004/0129099 A1 Jul. 8, 2004

Related U.S. Application Data

(60) Provisional application No. 60/291,112, filed on May 15, 2001.

(51) Int. Cl.[7] .............................................. F16H 21/16
(52) U.S. Cl. .............................................. 74/25; 74/61
(58) Field of Search ....................................... 74/25, 61

(56) References Cited

U.S. PATENT DOCUMENTS

| | | | | |
|---|---|---|---|---|
| 4,776,156 A | * | 10/1988 | Brown et al. ............... | 56/340.1 |
| 4,994,698 A | * | 2/1991 | Kliman et al. ............... | 310/81 |
| 5,316,319 A | * | 5/1994 | Suggs ....................... | 277/308 |
| 2002/0187020 A1 | * | 12/2002 | Julien ....................... | 411/544 |
| 2003/0049095 A1 | * | 3/2003 | Boyer et al. ............... | 411/416 |

FOREIGN PATENT DOCUMENTS

| | | |
|---|---|---|
| DE | 2815391 A | 10/1979 |
| DE | 3303745 A | 8/1984 |
| JP | 919131 | 1/1997 |
| RU | 529063 A | 4/1977 |
| RU | 597548 A | 3/1978 |
| RU | 954203 A | 9/1982 |
| RU | 977144 A | 11/1982 |

OTHER PUBLICATIONS

Patrick Andreas Petri, "Vibration–Induced Rotation", Massachusetts Institute of Technology, Department of Mechanical Engineering, May 14, 2001, pp. 3–61.

Vinogradov et al., "On a High Frequency Mechanism of Self–loosening of Fasteners", American Society of Mechanical Engineers, Design Engineering Division (Publication) DE. Publ. by American Society of Mechanical Engineers (ASME), New York, NY, USA V. 18–4, pp. 131–137 (1989).

* cited by examiner

Primary Examiner—David Fenstermacher
(74) Attorney, Agent, or Firm—Iandiorio & Teska

(57) ABSTRACT

The conversion of vibration induced rotation into translational motion is effected by engaging two threaded bodies with a gap between them and vibrating one of the bodies to induce rolling contact rotation between the threads of the bodies relative to each other and generating a net translational motion of the other body along the axis of the threads of the translating body.

22 Claims, 12 Drawing Sheets

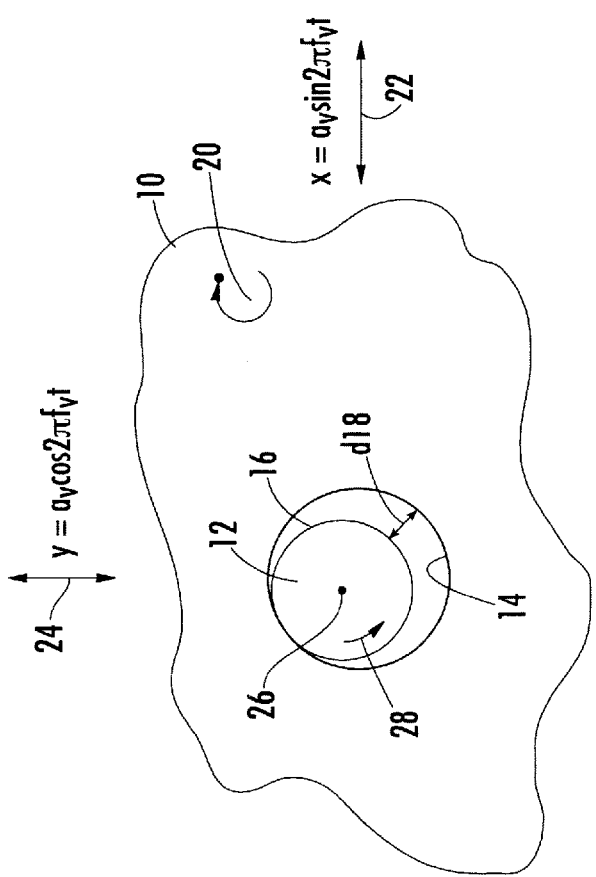
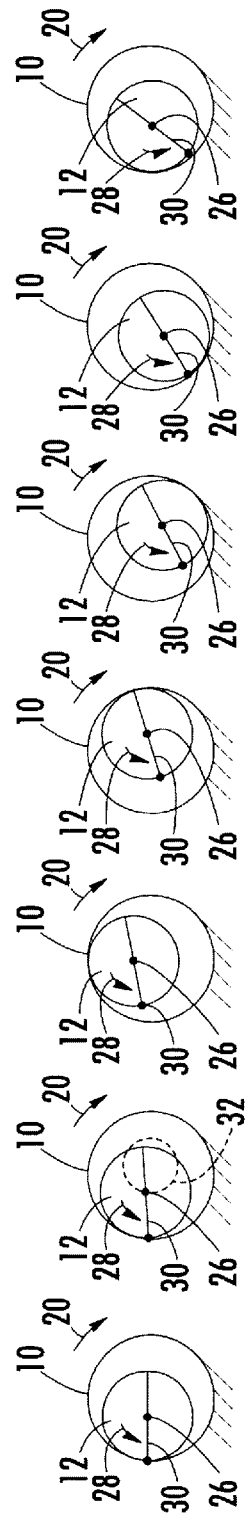

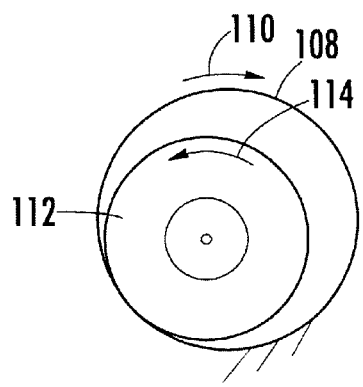
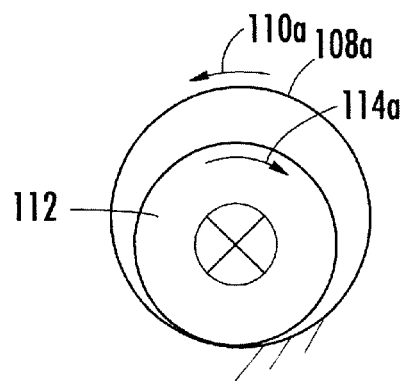
FIG. 9A.   FIG. 9B.
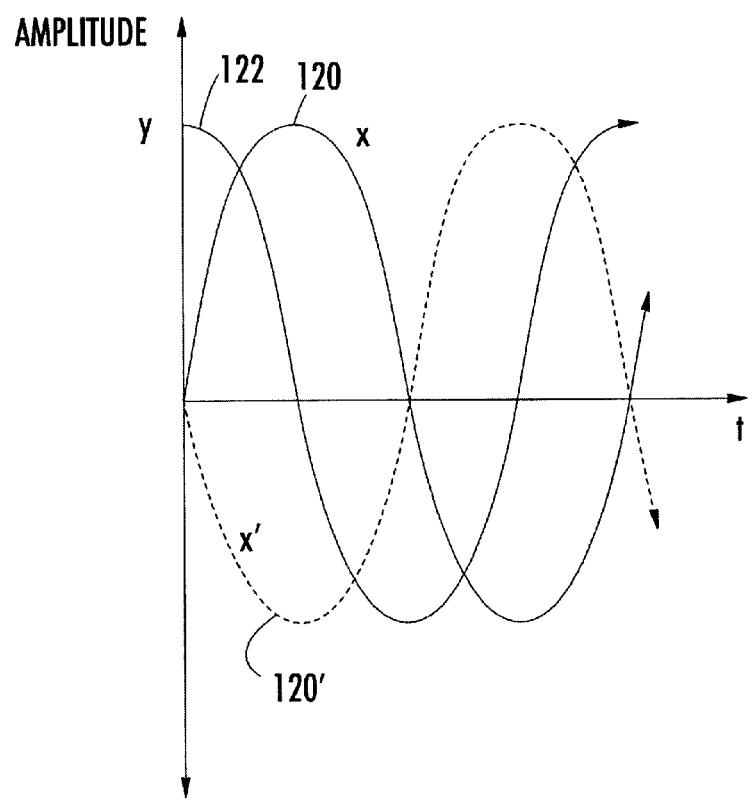
FIG. 10.

METHOD AND MECHANISM FOR CONVERTING VIBRATION INDUCED ROTATION INTO TRANSLATIONAL MOTION

RELATED CASE

This application claims priority of U.S. Provisional Application No. 60/291,112 filed May 15, 2001, entitled VIBRATION INDUCED ROTATION.

FIELD OF THE INVENTION

This invention relates to a method and a mechanism for converting vibration induced rotation into translational motion.

BACKGROUND OF THE INVENTION

Conventional threaded bodies e.g. nut and bolt, stud and block are engaged by means of some sort of device like a screwdriver, wrench or gripping device which is used to rotate one of the threaded bodies relative to the other with sliding contact between the mating threads to translate the two bodies into or out of engagement with each other. Each pair of bodies requires individual driver action, at least one of the pair must be designed to accept the driver and the driven body must, also, be accessible to the driver. The threading or screwing operation can become difficult when the driven body is very small. At any size there is the danger that the driving force balanced against the frictional force of the sliding threads can exceed the shear strength of the body and break it. The driven body must have a defined length: it typically requires an end configured to receive a driver.

Common vibration techniques have been used to loosen and tighten nuts and bolts using rotary vibration pulses, Russian Patent Nos. SU 977144-A, SU 954203-A and to loosen frozen nuts German Patent No. DE2815391-AT. Vibration has also been used to move powder in a helical chamber, Russian Patent No. SU 5229063-A, and in a circular path, German Patent No. DE3303745-A1. In one case vibration induced rotation has been used to drive individual screwdrivers in sleeves, each screwdriver being engaged with a separate screw. The rotation of each screwdriver drives its associated screw in the conventional way.

SUMMARY OF THE INVENTION

It is therefore an object of this invention to provide a method and mechanism for converting vibration induced rotation into translational motion.

It is a further object of this invention to provide such a method and mechanism which drives threaded bodies to engage and/or to disengage without a driver, independent of their size or length and without imposing damaging shear forces or causing cross-threading.

It is a further object of this invention to provide such a method and mechanism which operates over a wide range of frequencies and is relatively independent of the amplitude of the actuating vibration.

It is a further object of this invention to provide such a method and mechanism which can function as a speed reducer to decrease the speed of the actuating vibration relative to that of the rotation of the translating body by a factor which is a function of the gap between the threads.

It is a further object of this invention to provide such a method and mechanism in which the speed of the vibration and of the translating body can be used to calculate the actual gap between the threads.

It is a further object of this invention to provide such a method and mechanism which has a unique and surprising motion that engrosses and intrigues observers making for an amusing device or toy.

The invention results from the realization that a truly new and unique method and mechanism for converting vibration induced rotation into translational motion useful for driverless actuation of screws, speed reduction and screw gap tolerance monitoring, for example, can be effected by engaging the threads of two threaded bodies and vibrating one of those bodies to induce rolling contact rotation between them to generate a net translational motion of the other body along the axis of the threads of the translating body.

This invention features a mechanism for converting vibration induced rotation to translational motion. There are first and second threaded bodies, one having external threads the other having internal threads for engaging the external threads. There is a gap between the threads and an actuator coupled to one of the bodies for vibrating that body to induce rolling contact rotation between the threads of the body relative to each other and generating a net translational motion of the other body along the axis of the threads of the translating body.

In a preferred embodiment the threads may be helical, the bodies may include a screw and a nut, the actuator may be a mechanical vibrator. The actuator may induce vibration in each of two perpendicular axes which are mutually perpendicular with the axis of the threads of the translating body, the vibrations may be sinusoidal, and the rotational motion may be circular. The actuator may include a piezoelectric device. The center of mass of the translating body may describe a helical path having a smaller pitch than the pitch of the threads on the bodies. The speed of rotation of the translating body may be reduced relative to the speed of the vibration in proportion to the ratio of the gap to the diameter of the translating body.

The invention also features a method of converting vibration induced rotation into translational motion including engaging the threads of first and second threaded bodies, one having internal threads the other external threads with a gap between them. One of the bodies is vibrated to induce rolling contact rotation between the threads of the bodies relative to each other and generating a net translational motion of the other body along the axis of the threads of the translating body.

In one embodiment, the actuator includes a motor attached to the first or second body, the motor having a shaft, the actuator further including an unbalanced mass on the shaft which causes vibrations. In one example the first body includes a block with at least one internally threaded hole therein and the second body is an externally threaded shaft. In another example, the first body includes a threaded shaft and the second body is a nut.

One method of converting vibration induced rotation into translational motion in accordance with this invention includes engaging the threads of first and second threaded bodies, one having internal threads the other external threads with a gap between them; and vibrating the first body to induce rolling contact rotation between the threads of the bodies relative to each other and generating a net translational motion of the second body along the axis of the threads of the second body. Preferably, the threads are helical. Vibrating typically includes attaching an actuator to the first body. The actuator induces a vibration in each of two perpendicular axes which are mutually perpendicular with the axis of the threads of the second body. In the preferred embodiment, the vibrations are sinusoidal, the rotational motion is circular, and the center of mass of the second body describes a helical path having a smaller pitch than the pitch of the threads on the bodies. Also, the speed of rotation of the second body is reduced relative to the speed of the vibrations in proportion to the ratio of the gap to the diameter of the second body.

One mechanism for converting vibration induced rotation into translational motion in accordance with this invention includes a first threaded body and a second threaded body wherein one said body has external threads and the other said body has internal threads. There is a gap between the internal and external threads and means, coupled to the first body, for vibrating that body to induce rolling contact rotation between the threads of the bodies relative to each other and generating a net translational motion of the second body along the axis of the threads of the second body. In one embodiment, the means is an actuator, configured to induce a vibration in each of two perpendicular axes which are mutually perpendicular with the axis of the threads of the second body.

A preferred mechanism for converting vibration induced rotation into translational motion in accordance with this invention includes a first threaded body and a second threaded body wherein one body has external threads and the other body has internal threads. There is a gap between the threads and an actuator coupled to the first body and configured to induce a sinusoidal vibration in each of two perpendicular axes, the axes being mutually perpendicular with an axis of the threads of the second body.

BRIEF DESCRIPTION OF THE DRAWINGS

Other objects, features and advantages will occur to those skilled in the art from the following description of a preferred embodiment and the accompanying drawings, in which:

FIG. 1 is a schematic plan view illustrating the vibration induced rotation of two threaded bodies according to this invention;

FIGS. 2A–G show a series of positions of the bodies illustrating the rolling contact rotation occurring in FIG. 1;

FIGS. 9A and B are schematic plan views showing the two directions of motion of the translating body;

FIG. 10 illustrates the phasing of the X,Y inputs that engender the two different directions shown in FIGS. 9A and B;

PREFERRED EMBODIMENT

Figure 3:
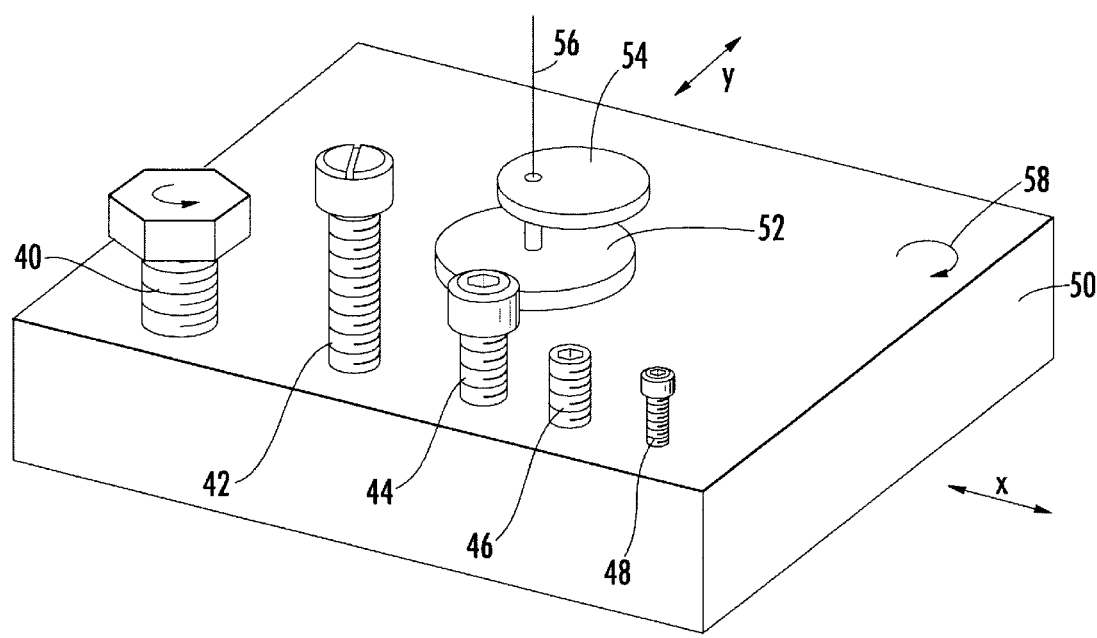
FIG. 3 is a diagrammatic three dimensional view of a mechanism for translating threaded bodies in response to vibration induced rotation.

This invention can be explained as follows. When a cylindrical body is inserted into a hole inside some medium, and that medium vibrated in a circular fashion around an axis parallel to the cylinder's axis of symmetry, the body will tend to rotate. This phenomenon, denoted herein as vibration induced rotation, or VIR, can be exploited for a large variety of applications. If the body is imbued with helical threads, every rotation will be associated with a corresponding linear motion in the axial direction, allowing even more complex, but useful, motion.

The necessary geometry is truly three-dimensional. Assume the hole lies in the X–Y plane of the coordinate system and the axis of the cylinder or screw is oriented along the Z-axis. Circular vibration, in its purest form, constitutes sinusoidal linear motion of the medium along the X-axis, coupled with cosinusoidal motion of the same amplitude along the Y-axis. However, VIR can still occur with motion deviating strongly from the ideal. Waveforms, relative amplitude and phase, and steadiness of frequency can vary widely. Random high frequency vibration, motion orthogonal to the Z-axis, and/or low frequency large-scale motion also does not, in general, prevent the cylinder from rotating. Also, note that the dynamics can easily be inverted, in which case the cylinder or screw would be driven, and the medium, e.g. a nut, obliged to rotate slowly.

One intriguing aspect of VIR is that the medium (in the regular, non-inverted case) need not undergo any rotation or net translation. Assuming the hole to be slightly larger than the cylinder, the medium may only undergo barely noticeable microscopic motion, whereas the cylinder/screw executes large-scale linear/rotary motion. It is not a resonance phenomenon, and can be driven at any frequency or amplitude, as long as friction and other retarding forces can be overcome, and the medium does not suffer damage.

The frequency of rotation scales with the driving frequency by the ratio of the effective gap to the effective diameter. Usually the gap will be assumed to be significantly smaller than the diameter, resulting in a much slower induced frequency; nonetheless, it is conceivable that certain applications might demand a gap larger than the cylinder diameter, in which case the body would rotate faster than its driving frequency. The effective gap is basically the difference between the diameters of the inner and outer bodies, but an unbalanced, partially inserted system, such as a screw with a heavy head, may require a more complicated relation. The effective diameter would be, in most cases, the pitch diameter of the translating body. The tendency to rotate may manifest itself in actual rotation, although it is nothing other than a torque in the Z-direction. If this torque overcomes retarding forces, Newton's laws imply motion.

Possible applications abound. Screws can be driven in or out of their hole, remotely, in parallel, and at high speed. The driving torque can easily be made strong enough to overcome significant friction. It may even be possible to spin the screw fast enough to give it the momentum required to tighten itself. Alternatively, the screw may be thermally "pre-stretched", letting a contraction provide the required clamping force. If an elastic medium separates the two parts that need to be assembled, the joint can be effected by clamping the two during insertion, relying on the elastic material's springback.

Even if VIR cannot replace the entire fastening process, it still has tremendous potential. It could speed up the production process, since most of the travel that a screw undergoes encounters little resistance. Another process would then tighten the screw fully. All that is necessary to drive VIR is an eccentrically spinning mass, and (especially since an arbitrary number of screws can be moved at once,) a VIR device should be cheap enough for medium to low volume production as well, reducing the workload of a human employee. VIR could be used to equally pre-torque a series of bolts, allowing accurate torquing via control of the angle of further rotation. (Torquing is a major concern in manufacturing.)

The remote aspect of VIR also has many advantages. Tiny screws, as those used in watches and micromachinery, need only be positioned, spinning themselves magically into the device. No head, slot, cap, or other gripping interface is required, making it possible to insert a shaft deeply into a hole without reaching it. Screws could be actuated that are within some inaccessible or unsafe location. A VIR-driven valve could be developed that operates in highly caustic environments.

VIR could be used to actuate devices of various sizes. Linear, rotary, or screw motion can easily be extracted. Since the transmission ratio depends on the pitch angle and the gap to diameter ratio, enormous mechanical advantages and frequency reductions are possible. All this points to use of piezoelectric (also electromagnetic, magnetostrictive, or electrostrictive) actuated embodiments of the invention, which could enable or replace comparable current systems.

A fuller explanation of the invention is contained in the thesis Vibration-Induced. Rotation submitted by the inventor herein in partial fulfillment of the requirements for the degree of Bachelor of Science in Mechanical Engineering at the Massachusetts Institute of Technology, May 2001, and is incorporated by reference herein in its entirety.

Previously it has been shown that inertial forces play no role in fastener loosening unless frequencies are extremely high. A bolted joint should therefore be analyzed like a mass sliding on a two-dimensional inclined plane. Vinograv, O and Huang, X. On a High Frequency Mechanism of Self-loosening of Fasteners. *American Society of Mechanical Engineers, Design Engineering Division (Publication) DE*. Publ. by American Society of Mechanical Engineers (ASME), New York, N.Y., USA. V. 18-4. P 131–7.

But without inertial forces, VIR is inconceivable. Over a cycle, the net force on a screw would be zero, if it didn't move. Inertia is what allows the system to function despite retarding forces. Most previous investigations have focused on fastener loosening, while VIR is most effective with bolts that are, in a sense, already loose. Since these previous studies have been concerned with fasteners in their pre-loaded state, it seems that VIR may have been overlooked as a mechanism that possibly accelerates loosening.

There are shown in FIG. 1 two bodies 10 and 12 according to this invention. Body 10 includes internal threads 14 while body 12 includes external threads 16 which engage the threads 14 of body 10. There is a gap d 18 between the threads 14 and 16, shown somewhat enlarged here for ease of understanding. In accordance with this invention, a rotational motion, for example in a clockwise direction as shown at arrow 20, is imparted to one of the bodies, in this case the outer body 10, by, for example, applying sinusoidal functions orthogonal to one another. For example, in the X direction as indicated by arrow 22, the function $a_v \sin 2\pi f_v t$ is applied while in the Y direction, as indicated by arrow 24, the applied wave form is $a_v \cos 2\pi f_v t$. Since the X and Y functions are equal amplitude sine and cosine, the circular motion 20 will be perfectly circular. As the body 10 rotates in a clockwise direction as indicated by arrow 20, the other body 12 rotates about its axis 26 in the direction of arrow 28.

The effect of these motions can be seen in the series of figures shown in FIGS. 2A–G. Initially, in FIG. 2A, the index line 30 on body 12 is horizontal. Body 10, which is being vibrated as explained, with respect to FIG. 1 is considered the fixed body, while body 12 would be the body which translates. As body 12 rotates in the direction of arrow 28, FIG. 2A, it moves progressively in rolling contact with body 10 as shown by the sequence of motions in FIGS. 2A–G. As the translating body moves around in rolling contact, its center of mass, on axis 26, moves in a helical path 32, which has a smaller pitch than the pitch of the internal and external threads on the bodies, as will be explained subsequently with respect to FIG. 8. Note that due to the rotation 20 of body 10 and the rotation 28 of body 12 when body 12 returns to its starting position in FIG. 2G, the index line 30 is not horizontal as it was in FIG. 2A, showing that there has been a net rotation of body 12, while body 10 has had no such movement.

In one embodiment a number of screws, including a hex head 40, FIG. 3, a slot head 42, a hex socket cap 44, a headless 46, and a small slotted head screw 48, function as the inner body 12, in FIGS. 1 and 2, and a block 50 functions as the outer body (nut) 10. A vibration, again, can be induced on the block in the X and Y directions by an actuator or means for vibrating such as motor 52, which spins unbalanced mass 54 eccentrically about its motor shaft 56. This vibration imparts the rotational motion to block 50, as indicated at arrow 58. Since the rotation is clockwise as viewed from above, the screws 40, 42, 44, 46, and 48 will rotate in the opposite direction and will unscrew. If the phase of the X and Y components are switched, then the circular motion 58 would reverse to the counterclockwise direction, and the screws would be driven in. Note that no driver is needed, be it wrench, screwdriver, or special allenhead. In fact, as shown with respect to set screw 46, there need be no engagement head at all on the screw in order for it to be driven by this mechanism and method.

Figure 4:
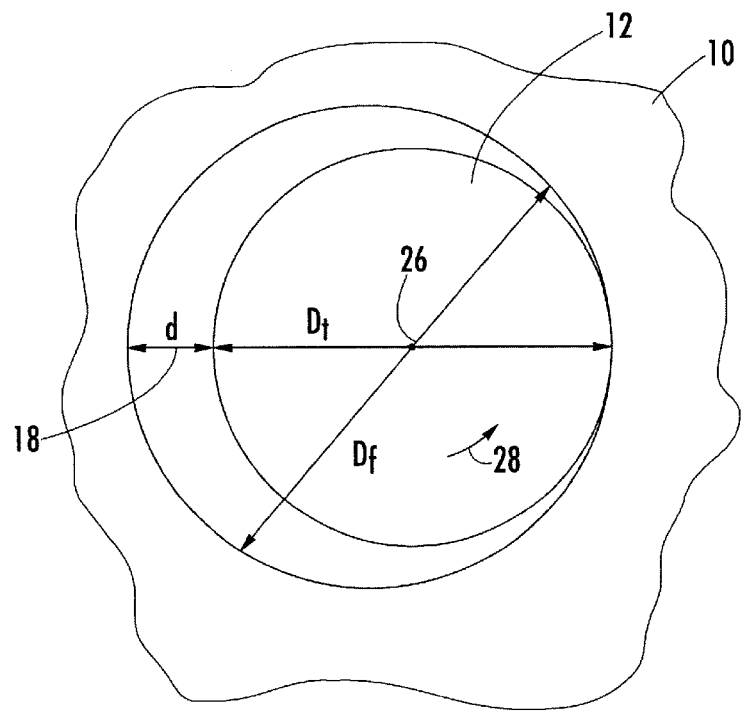
FIG. 4 is a schematic plan view similar to FIG. 1 showing the relationship of the frequency of vibration, frequency of the translating body, diameter of the translating body and the gap.

The gap d 18, FIG. 4, is defined as the difference between the diameter of the translating body $D_t$ and the diameter of the vibrated body $D_f$:

$$d = D_f - D_t \tag{1}$$

Thus, the relationship between the exciting vibrating frequency $f_v$ and the frequency or speed of the rotation of the translating body $f_t$ is given by the relationship:

$$f_t = f_v \frac{d}{D_t} \tag{2}$$

The gap d can be arbitrarily small; the gap that normally occurs in commercially available nuts and bolts is sufficient.

Figure 5:
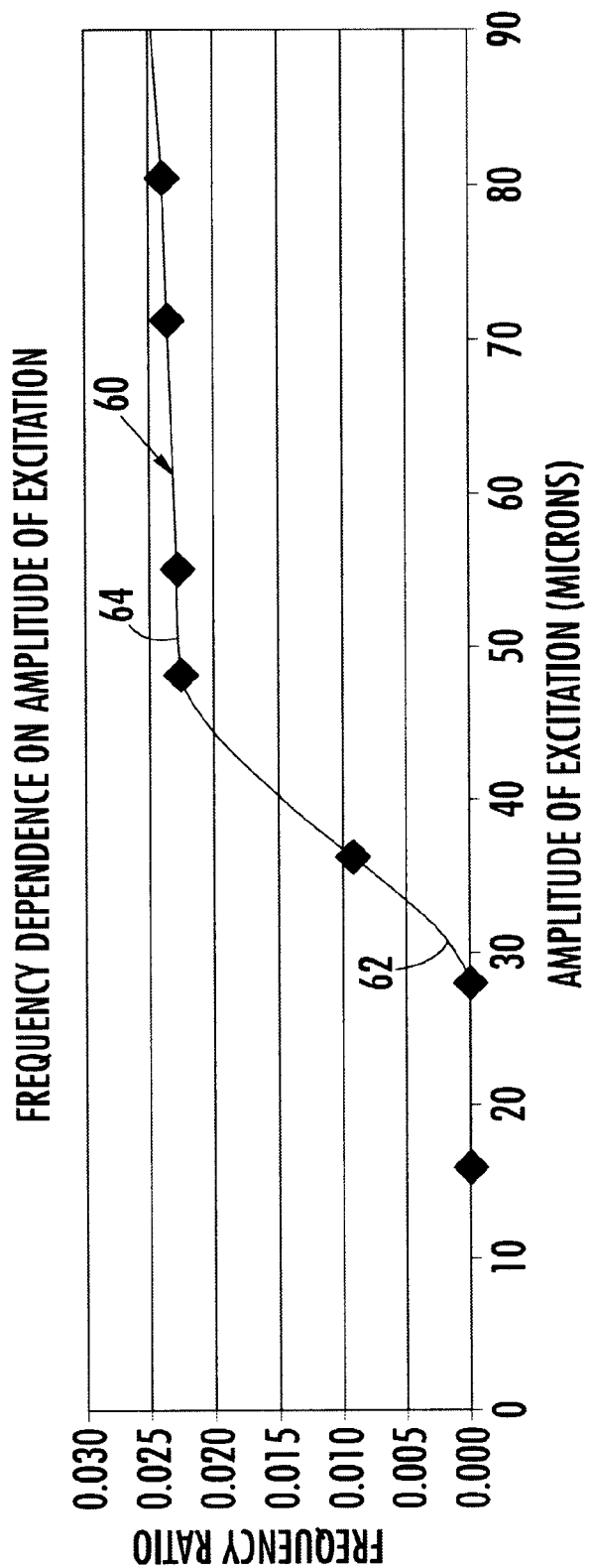
FIG. 5 is an illustration of the relative independence of the frequency of the translating body with respect to the amplitude of the excitation.

The mechanism and the method according to this invention do not depend heavily on the amplitude of the exciting vibrations, as indicated by characteristic 60, FIG. 5, where it can be seen that once the amplitude begins, at 62, to overcome the forces of friction and inertia, it levels off, beginning at 64, so that further amplitude increases have very little effect on the frequency ratio, where the frequency ratio is that of the induced rotational frequency to the vibrational frequency.

Figure 7A:
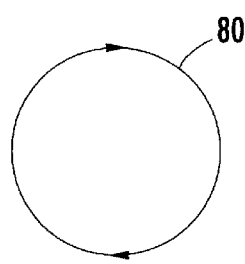
FIGS. 7A–D illustrate some possible rotational paths which are capable of driving the translating body in accordance with this invention.
Figure 7B:
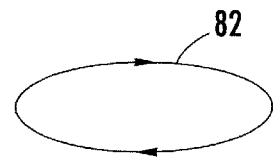
Figure 7C:
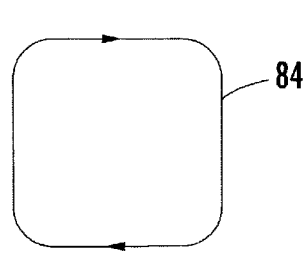
Figure 7D:
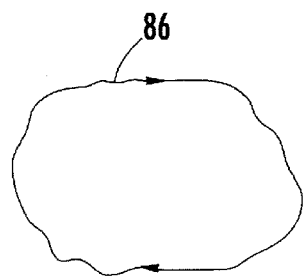
Figure 6:
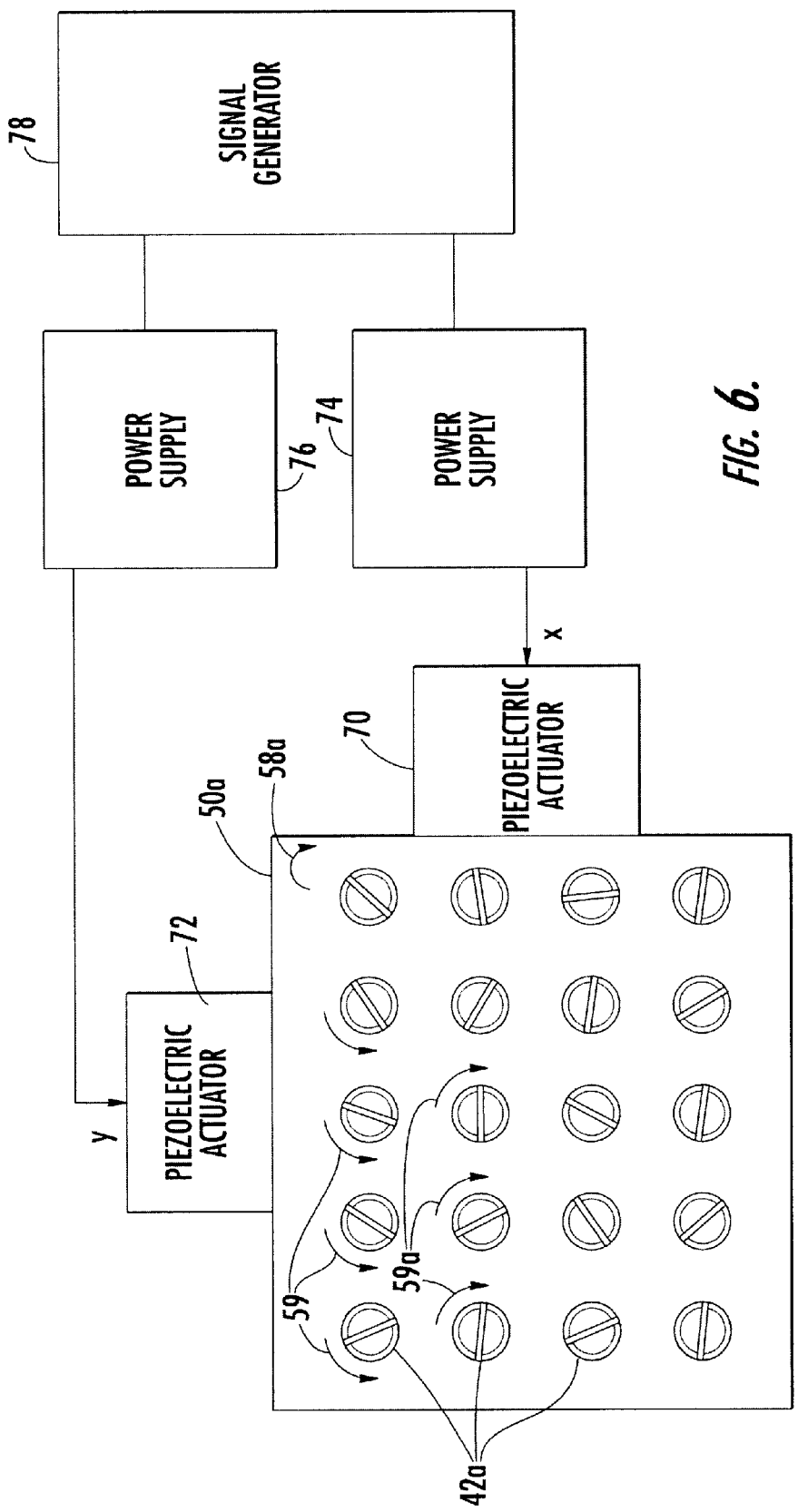
FIG. 6 is schematic diagram of one embodiment of a mechanism according to the invention driven with a piezoelectric actuator.

Although thus far the excitation has been provided by a motor 52 driving an eccentric weight 54, this is not a necessary limitation of the invention, as any suitable means can be used for generating vibrations. For example, piezo-electric actuators 70 and 72, FIG. 6, can be used to provide the X and Y excitations. A pair of power supplies 72 and 76 operate actuators 70 and 72, respectively, and the signal generator 78 sets the phase relationship of the power supplied to actuators 70 and 72. With one phase setting, body 50a rotates in the clockwise direction 58a so that all of the screws rotate in the opposite (unscrewing) direction as indicated at 59. By simply switching the phase relationship, the rotation indicated at arrow 58a can be reversed to the counterclockwise direction, so that the screws now rotate in a clockwise direction as shown by arrow 59a, and the screws are driven into the block 58a. Depending upon the shape of the input wave forms from actuators 70 and 72 and their phase relationship, the rotational output can have any form, such as circular path 80, FIG. 7A, elliptical path 82, FIG. 7B, rounded square path 84, FIG. 7C, or an irregular shape 86, FIG. 7D.

Figure 8:
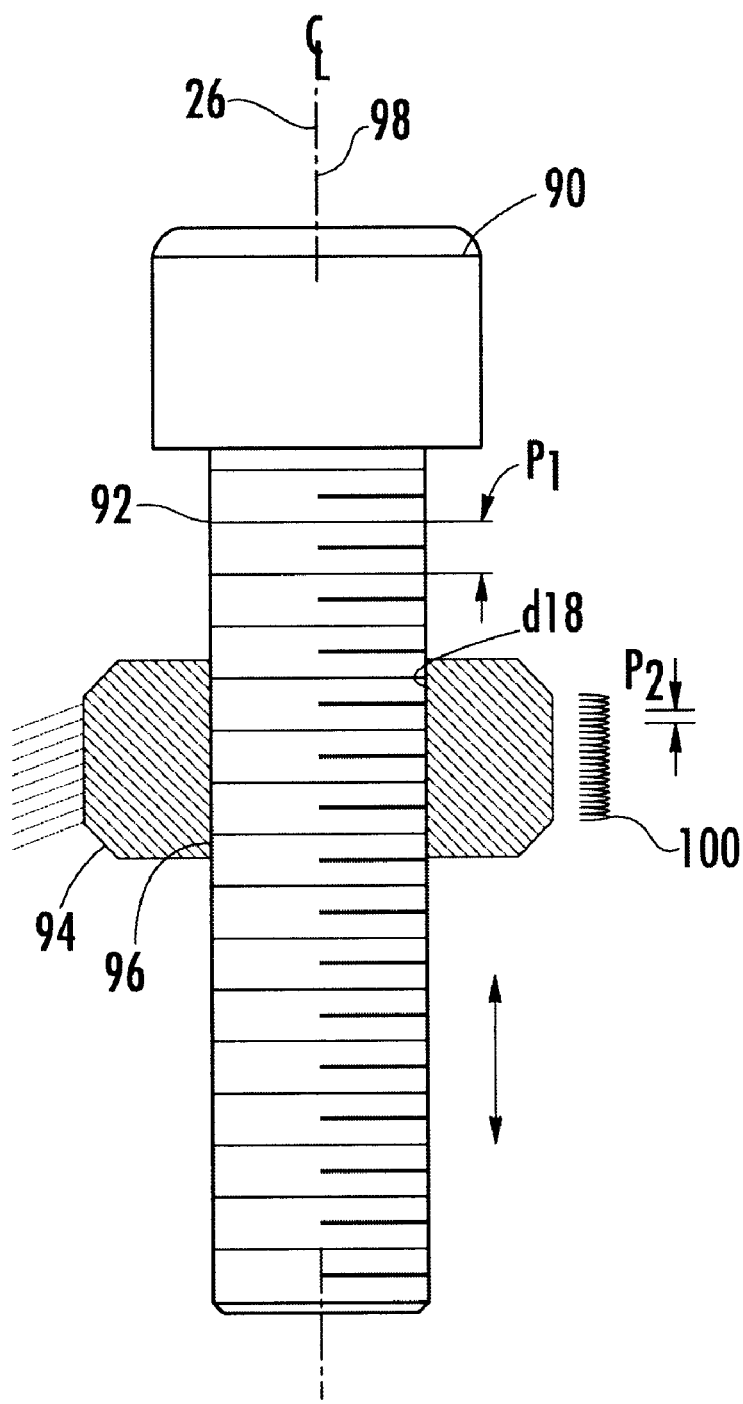
FIG. 8 is a side elevational view with parts in section illustrating the gap, the helical motion of the translating body and the difference in pitch between the threads and helical motion.

In FIG. 8, body 90 is a screw having external threads 92, while body 94 is a nut having internal threads 96. There is a gap d18 clearly shown between the threads 96 of nut 94 and the threads 92 of screw 90. Assuming, once again, that the body with the internal threads, nut 94, is fixed and excited with the vibrations, then the body 90 with the external threads 92 will move to and fro, in and out of nut 94, depending upon the direction of the rotational motion induced in nut 94. The helical path that the center of mass of screw 90, located along center line 98 describes is shown schematically at 100. It can be seen that the pitch $P_2$ of this helix, described by the center of mass of screw 90 is much smaller than the pitch $P_1$ of threads 92 on the translating body; that is:

$$P_2 \ll P_1 \qquad (3)$$

The difference in pitch suggests the speed reduction function of the device, and the helical path 100 followed by the center of mass of screw 90 distinguishes it from the normal threaded advancement of screw and nut combinations, whose center of mass moves in a linear, not helical, path. The pitch $P_2$ of the helical motion of the center of mass is related to the pitch of the translating body $P_1$ by the ratio of the gap d and the diameter of the translating body $D_t$:

$$P_2 = P_1 \times \frac{d}{D_t} \qquad (4)$$

Depending upon the direction of rotation of the fixed body, the translating body may move into or out of engagement; for example, in FIG. 9A, the outer body 108 is vibrated to provide a circular motion 110 in a clockwise direction, and so the inner body 112 rotates in the direction of arrow 114, and that the translating body 112, which might be a screw, will unscrew from the block or body 108, assuming right handed threads and that this body is viewed from above. Similarly, if the circular motion imparted 110a, FIG. 9B, is counterclockwise, then the translational body 112 rotates in the clockwise direction 114a and body or screw 112 will be screwed into, or engage with body, 108. When the rotational motion is induced by X and Y wave forms of the sinusoidal shape, for example a sine wave 120 and cosine wave 122, FIG. 10, the direction of rotations 110 and 110a of the vibrating body are controlled by the phase of those two wave forms 120 and 122. For example, when the Y or cosine wave 122 leads the X, or sine, wave 120, the direction is clockwise 110, FIG. 9A, and the screw 112 unscrews. When the reverse is true, that is where X' 120' leads Y 122 the rotation induced in body 108 is counterclockwise, arrow 110a, FIG. 9B, and so the screw 112 is further engaged, or is screwed in.

Figure 11:
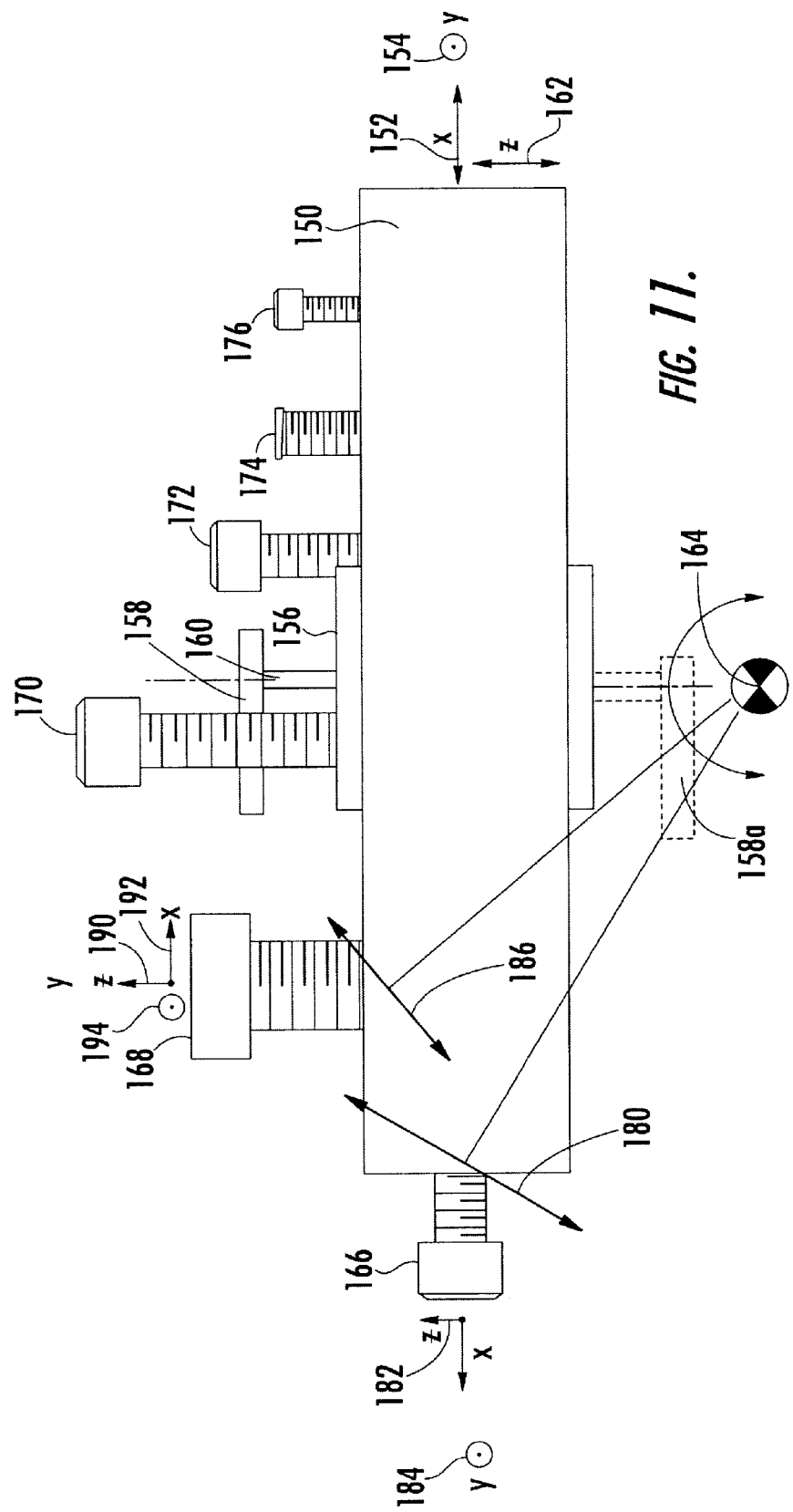
FIG. 11 is a side elevational view of the mechanism of FIG. 3 illustrating the motion along the X, Y and Z axes.

Although the circular motion required to induce the translational motion according to this invention is described along two orthogonal axes, the motion may be more complex and occur in three dimensions, or along three axes, X, Y, and Z; nevertheless, the invention applies so long as the vibrational induced rotation occurs locally along two axes orthogonal to the axis of the translating body. For example, as shown in FIG. 11, the body 150 may be excited along the X 152 and Y 154 axes by motor 156 rotating eccentric mass 158 on shaft 160. There will also, however, be a Z 162 component so that the resulting motion of body 150 can instantaneously be viewed as pure circular motion about point 164. At any given moment, each of the other bodies or screws 166, 168, 170, 172, 174, and 176 can be analyzed to reveal that they, too, have two components locally orthogonal to their longitudinal axis. For example, screw 166, at the instant shown, is undergoing a motion as indicated at 180 as a consequence of the rotation around point 164. This motion can be decomposed into two components, the Z component 182 and the X component 185. After the next quarter rotation, the resultant forces on screw 166 will lie in the XY plane. Ignoring the X component both times, the Z and Y components provide the components orthogonal to the screw 166 axis, X, which produce rotational motion to cause screw 166 to follow the non-slip rolling rotation in accordance with this invention. Similarly, with respect to screw 168, the motion at the given instant 186 can be resolved into Z 190 and X 192 components; in the next quarter rotation it will contain only a Z 190 component and Y 194 component. Thus, ignoring the effect of the Z component along the translational axis of screw 168, there will be a periodic occurrence alternatingly of the X and Y components, which will provide the rotational motion necessary to cause the rolling contact movement of the screw 168 in the threaded block 150.

This more complex motion is desirable in some ways, since it allows the effect utilized by this invention to be applied to screws that are not just perpendicularly mounted to the block 150, but could be at nearly any angle, including at 90 degrees to the block, as shown with respect to screw 166. Nevertheless, if it is desirable to eliminate this Z axis motion, it can be done, for example, by driving a second eccentric weight 158a on the extended shaft of motor 156 to balance the effect of mass 158, thereby reducing or eliminating the Z motion.

Figure 12:
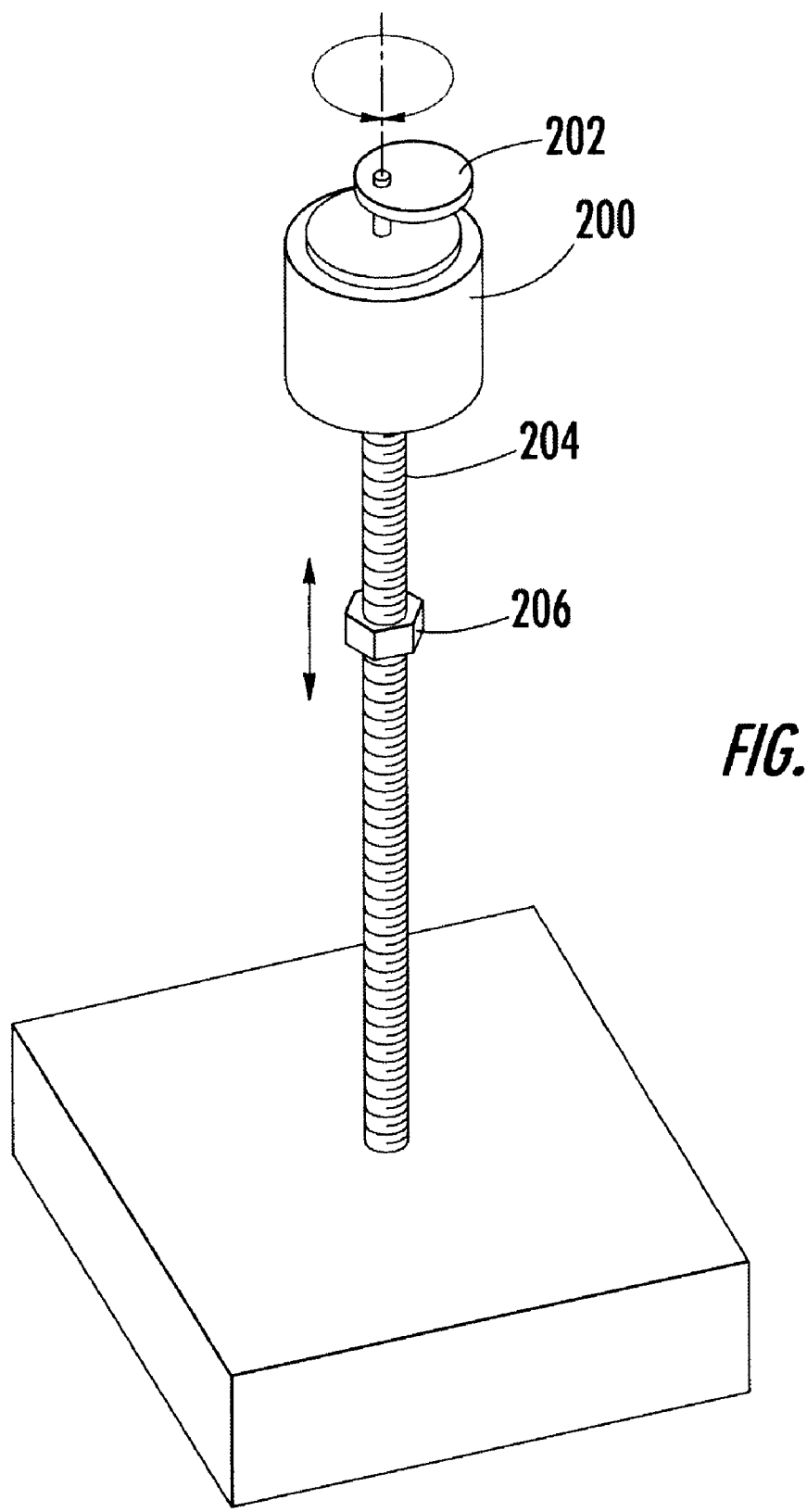
FIG. 12 is a three dimensional diagrammatic view of a mechanism according to this invention in which the screw (externally threaded body) is driven and the nut translates.
Figure 13:
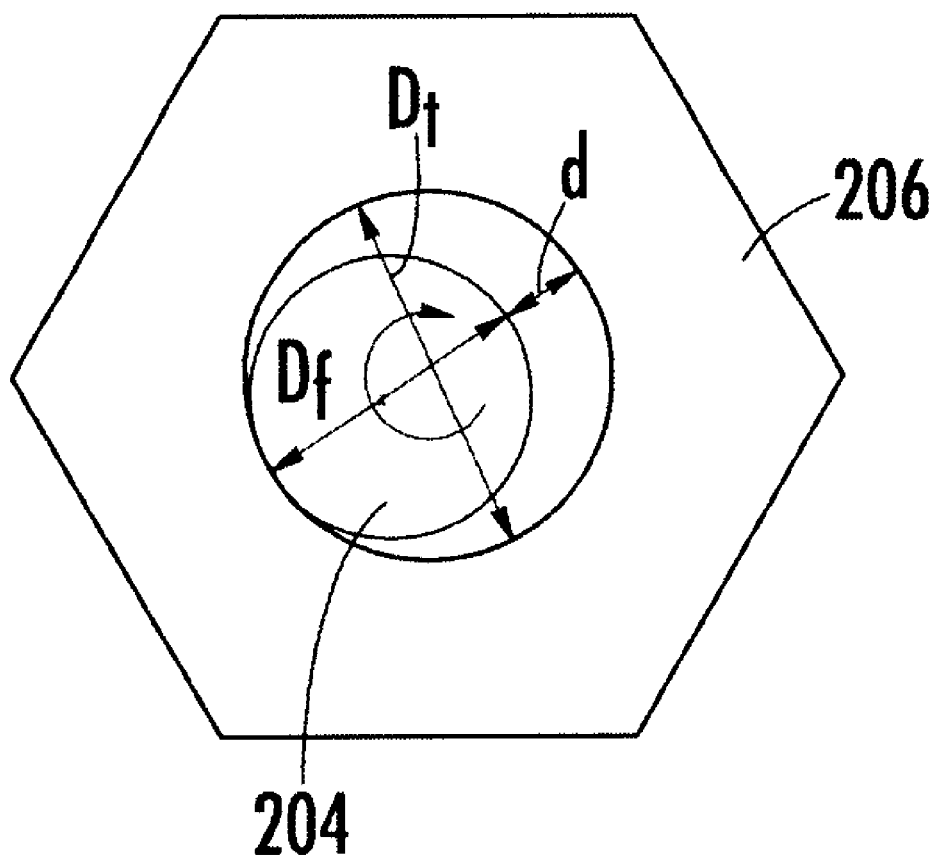
FIG. 13 is a schematic diagram similar to FIG. 4 showing the relationships of frequency, diameter and gap when the nut (internally threaded body) is the translating body.

Although thus far the internally threaded body or nut has been the fixed vibrationally rotated body and the externally threaded body or screw has been the translational body, this is not a necessary limitation of the invention. For example, as shown in FIG. 12, motor 201 with eccentrically driven mass 202 is attached to the externally threaded body, screw 204, via holding cup 200. Thus, the rotational motion induced in screw 204 by the vibrations causes internally threaded body, nut 206, to run up or down screw 204. The operation of the invention, however, is the same, as shown in FIG. 13. The gap d is still defined by the difference between the diameter of the translational body $D_t$ and the diameter of the fixed body $D_f$, that is:

$$d=D_t-D_f \quad (5)$$

The only difference is that in this case the translational body is the nut 206 and the fixed body is the screw 204. In this case the diameter of the translating body is the larger one, whereas in the earlier case shown in FIG. 4, the fixed body was larger. Thus, to ensure that d remains a positive quantity, $D_f$ is subtracted from $D_t$, and not vice-versa. The relationship of the vibrational frequency to the frequency of the translating body 206 is defined as previously, that is:

$$f_t = f_v \frac{d}{D_t} \quad (6)$$

Figure 14:
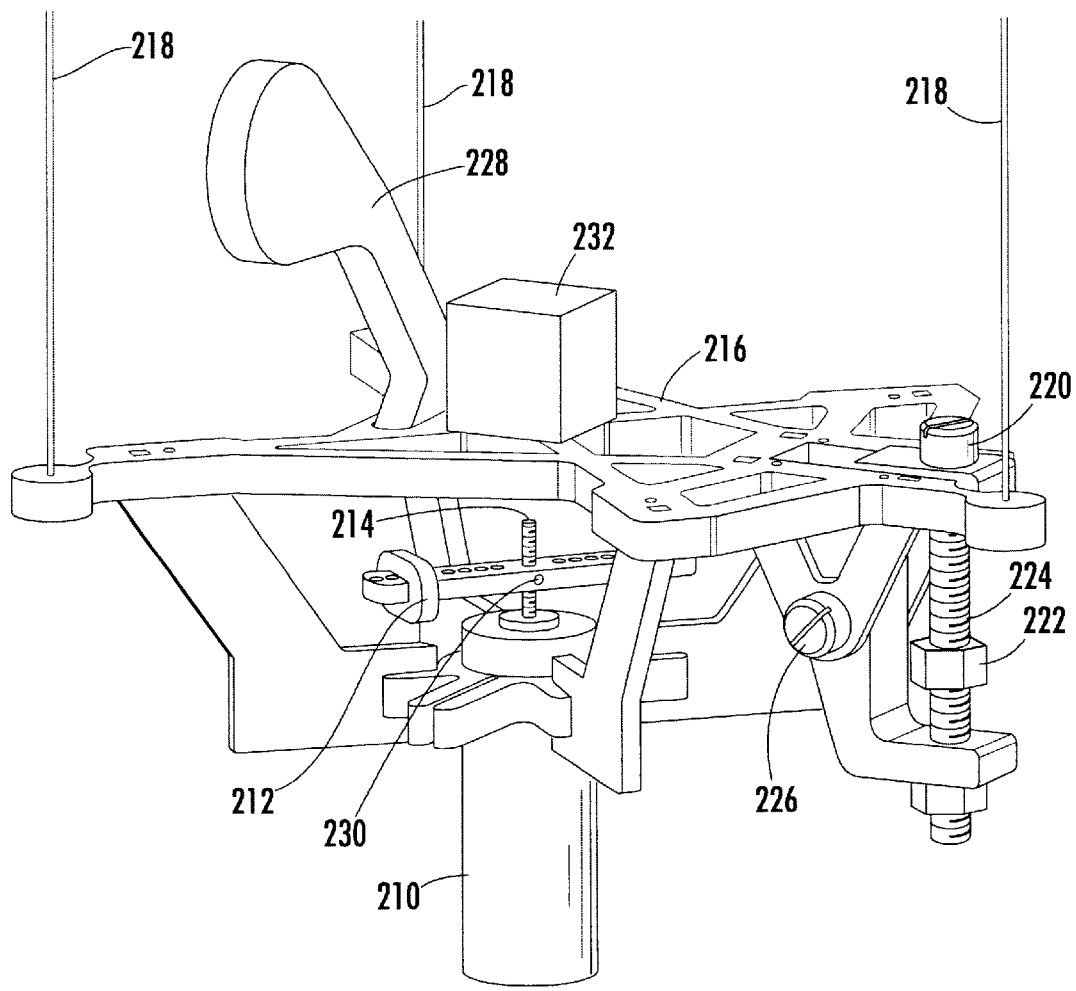
FIG. 14 is a three dimensional view of a mechanism according to this invention with more nearly pure circular motion.

In another embodiment, FIG. 14, which provides more nearly pure circular rotation, motor 210 drives an eccentric weight 212 on shaft 214 to provide a vibration which induces a rotational motion in frame 216 suspended on supports 218. The vibration of frame 216 induces a rotational motion in screw 220 which causes nut 222 to ride up/down the threads 224 of screw 220. In this particular embodiment a pivot screw 226 is utilized to allow screw 220 to be oriented at a wide range of angles to show that, in fact, at various angles, localized rotational motion does occur, and occurs in sufficient magnitude so that nut 222 travels up/down the threads 224 of screw 220. The small balancing mass 228 is used to ensure that the center of mass is at or very close to point 230 to ensure nearly pure circular motion. An accelerometer 232 was used to verify the circularity of the motion.

Figure 15:
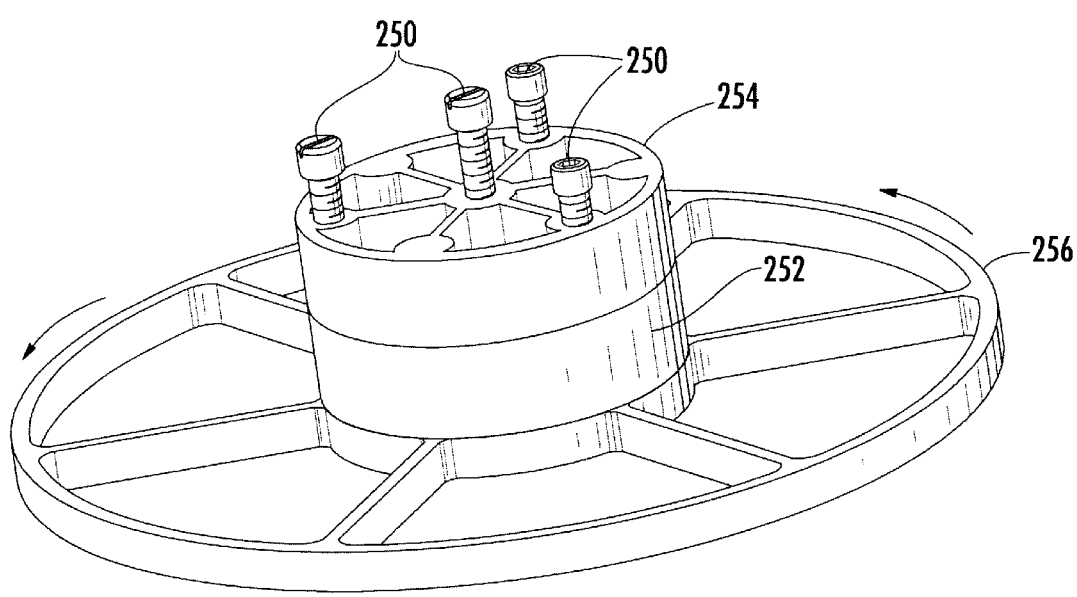
FIG. 15 illustrates a method according to this invention for obtaining the rotational motion without the actuator necessarily permanently attached to the fixed body.

Although thus far the mechanism and method of this invention is shown with an actuator permanently attached to one or the other of the bodies, this is not a necessary limitation of the invention. As shown in FIG. 15, screws 250 constitute the translational bodies with external threads, while block 252 constitutes the fixed body which is to be rotated and contains the internal threads. Jig 254 acts as a keeper to hold the screws loosely in position until the rotational action can begin their translation, so that they screw themselves into block 252. The motion here is similar to that described in FIG. 11, that is, a motion which occurs along all three axes, X, Y, and Z. In this case the hub or circular frame 256 spins about much in the same fashion as a penny which has been spun and is starting to slow down and flatten out, perhaps more commonly described as a wobble. In the lower stages that wobble may be thought of as a vibration which induces the circular rotational motion of block or body 252 to provide the local rotations at each of the screws 250 to cause the no-slip contact rolling motion of the external threads on the screws and the internal threads in block 252, so that the screws follow their own helical path and translate as explained before. This motion can be actuated and then the actuator removed to permit the motion to carry on on its own. For example, it can be done by a human hand, or it can be done by a battery or magnet driven mechanism that keeps the motion going for a sustained period. In either case, the device carries out the method in accordance with this invention.

Although specific features of the invention are shown in some drawings and not in others, this is for convenience only, as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A mechanism for converting vibration induced rotation into translational motion, the mechanism comprising:
   first and second threaded bodies, one body having external threads the other body having internal threads for engaging said external threads;
   a gap between said threads; and
   an actuator coupled to said first body for vibrating that body to intentionally induce rolling contact rotation between said threads of said bodies relative to each other and generating a net translational motion of said second body along the axis of said threads of said second body.

2. The mechanism of claim 1 in which said threads are helical.

3. The mechanism of claim 1 in which said actuator induces a vibration in each of two perpendicular axes which are mutually perpendicular to the axis of said threads of said second body.

4. The mechanism of claim 3 in which said vibrations are sinusoidal and the rotational motion is circular.

5. The mechanism of claim 1 in which said actuator includes a piezoelectric device.

6. The mechanism of claim 2 in which the center of mass of said second body describes a helical path having a smaller pitch than the pitch of the threads on the bodies.

7. The mechanism of claim 1 in which the speed of rotation of the second body is reduced relative to the speed of the vibrations in proportion to the ratio of the gap to the diameter of the second body.

8. The mechanism of claim 1 in which the actuator includes a motor attached to the first or second body, the motor having a shaft, the actuator further including an unbalanced mass on the shaft which causes said vibrations.

9. The mechanism of claim 1 in which said first body includes a block with at least one internally threaded hole therein and the second body includes an externally threaded shaft.

10. The mechanism of claim 1 in which the first body includes a threaded shaft and the second body includes a nut.

11. A method of converting vibration induced rotation into translational motion, the method comprising:
    engaging the threads of first and second threaded bodies, one having internal threads, the other external threads, with a gap between them; and
    vibrating the first body to intentionally induce rolling contact rotation between the threads of the bodies relative to each other and generating a net translational motion of the second body along the axis of the threads of the second body.

12. The method of claim 11 in which said threads are helical.

13. The method of claim 11 in which vibrating includes attaching an actuator to the first body.

14. The method of claim 13 in which said vibration occurs in each of two perpendicular axes which are mutually perpendicular with the axis of the threads of the second body.

15. The method of claim 14 in which said vibrations are sinusoidal and the rotational motion is circular.

16. The method of claim 11 in which the center of mass of the second body describes a helical path having a smaller pitch than the pitch of the threads on the bodies.

17. The method of claim 11 in which the speed of rotation of the second body is reduced relative to the speed of the vibrations in proportion to the ratio of the gap to the diameter of the second body.

18. A mechanism for converting vibration induced rotation into translational motion, the mechanism comprising:
   a first threaded body;
   a second threaded body;
   one said body having external threads, the other said body having internal threads;
   a gap between the internal and external threads;
   means, coupled to the first body, for vibrating that body to intentionally induce rolling contact rotation between the threads of the bodies relative to each other and generating a net translational motion of the second body along the axis of the threads of the second body.

19. The mechanism of claim 18 in which said means is an actuator.

20. The mechanism of claim 18 in which said means is configured to induce a vibration in each of two perpendicular axes which are mutually perpendicular with the axis of the threads of the second body.

21. A mechanism for converting vibration induced rotation into translational motion, the mechanism comprising:
   a first threaded body;
   a second threaded body;
   one said body having external threads, the other said body having internal threads;
   a gap between said threads; and
   an actuator coupled to one of said bodies and configured to vibrate that body to induce rolling contact rotation between the threads of the bodies relative to each other and generating a net translational motion of the other body along the axis of the threads of the translational body.

22. A mechanism for converting vibration induced rotation into translational motion, the mechanism comprising:
   a first threaded body;
   a second threaded body;
   one body having external threads, the other body having internal threads;
   a gap between the said threads; and
   an actuator coupled to the first body and configured to induce a sinusoidal vibration in each of two perpendicular axes, said axes mutually perpendicular with an axis of the threads of the second body.

* * * * *